(12) United States Patent
Tateiwa

(10) Patent No.: US 8,867,911 B2
(45) Date of Patent: Oct. 21, 2014

(54) DEVICE TO DETERMINE A PHASE DIFFERENCE OF IN-PHASE AND QUADRATURE COMPONENT OF SIGNAL LIGHT, AND A METHOD TO DETERMINE THE PHASE DIFFERENCE

(75) Inventor: Yoshihiro Tateiwa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 192 days.

(21) Appl. No.: 13/598,266

(22) Filed: Aug. 29, 2012

(65) Prior Publication Data

US 2013/0064540 A1    Mar. 14, 2013

(30) Foreign Application Priority Data

Sep. 8, 2011  (JP) ................. P2011-196055

(51) Int. Cl.
| | |
|---|---|
| H04B 10/08 | (2006.01) |
| H04B 17/00 | (2006.01) |
| H04B 10/06 | (2006.01) |
| H04B 10/61 | (2013.01) |
| G01J 9/00 | (2006.01) |
| H04L 27/36 | (2006.01) |
| H04L 27/38 | (2006.01) |

(52) U.S. Cl.
CPC ............ H04B 10/6165 (2013.01); G01J 9/00 (2013.01); H04L 27/364 (2013.01); H04L 27/3863 (2013.01)
USPC ............ 398/25; 398/202; 398/203; 398/204; 398/208

(58) Field of Classification Search
CPC .................. H04B 10/6165; H04B 10/613
See application file for complete search history.

(56) References Cited

U.S. PATENT DOCUMENTS

2010/0329697 A1*  12/2010  Koizumi et al. ............... 398/208

FOREIGN PATENT DOCUMENTS

JP         09-199991        7/1997

OTHER PUBLICATIONS

Estimating Phase Difference and Lead of Discrete Cosine Ultrasonic Wave Signals Based on Hilbert Transform and Lissajous Figure Features, Long Jianjun, Wu Baihai, Wu Jinping, 2010 International Conference on Measuring Technology and Mechatronics Automation.*

* cited by examiner

*Primary Examiner* — Shi K Li
*Assistant Examiner* — Mina Shalaby
(74) *Attorney, Agent, or Firm* — Venable LLP; Michael A. Sartori; George L. Howarah

(57) ABSTRACT

A device able to evaluate a phase difference between I-component and Q-component of signal light generated by an optical hybrid is disclosed. The device includes a detector, a compensator and an evaluator. The detector detects positive and negative elements of each of the I-component and the Q-component. The compensator generates a compensated I-component and a compensated Q-component so as to keep the sum of positive and negative elements of each of components in constant. The evaluator determines the phase difference via an ellipsoid drawn by the compensated I- and Q-components.

12 Claims, 7 Drawing Sheets

_US 8,867,911 B2_

DEVICE TO DETERMINE A PHASE DIFFERENCE OF IN-PHASE AND QUADRATURE COMPONENT OF SIGNAL LIGHT, AND A METHOD TO DETERMINE THE PHASE DIFFERENCE

BACKGROUND OF THE INVENTION

1. Field of the Invention

The present invention relates of a device able to determine a phase difference between an in-phase component (hereafter denoted as I-component) and a quadrature component (hereafter denoted as Q-component) of signal light input to and generated by an optical hybrid.

2. Related Background Art

An optical communication system, in particular, the optical coherent system uses an optical hybrid that enables to generate the I-component and the Q-component of signal light input thereto. Although two components ideally have a phase difference of 90° ($\pi/2$), a phase shift from 90° strongly affects the quality of the optical signal in the communication system.

SUMMARY OF THE INVENTION

One aspect of the present application relates to a device that detects a phase difference between an I-component and a Q-component of an optical signal caused by an optical hybrid by coupling the signal light with local light. The device of an embodiment includes a detector, a compensator, and an evaluator. The detector detects a positive element and a negative element of each of the I-component and the Q-component. The compensator generates a compensated I-component and a compensated Q-component by keeping both of an equivalent magnitude of the I-component and an equivalent magnitude of the Q-component in constant.

In an example, the compensator divides each of the positive and negative elements of each of the I- and Q-components by a sum of respective positive and negative elements to generate the compensated I- and Q-components. The evaluator determines the phase difference through a Lissajous figure elliptically drawn by the compensated I-component and the compensated Q-component. Specifically, the evaluator determines the phase difference based on an equation of:

$$\cos(\Delta\phi) = e_0/e \text{ or } \cos(\Delta\phi) = f_0/f,$$

where $\Delta\phi$ is the phase difference to be determined, $e_0$ or $f_0$ is a magnitude of the I-component or the Q-component when the other component becomes zero, and e or f is the maximum of the I- or Q-component. Or, the evaluator determines the phase difference according to an equation of:

$$\sin(\Delta\phi) = (x^2 - y^2) \times \tan(\theta) / \{(x^2 \times \tan^2(\theta) + y^2) \times (x^2 + y^2 \times \tan^2(\theta))\}^{1/2},$$

where x and y are major and minor axes of the elliptic Lissajous figure drawn by the compensated I- and Q-components, and e is an angle between the major axis of the elliptic Lissajous figure and the direction of the I-component.

Another aspect of the present application relates to a method to detect a phase difference between an I-component and a Q-component of signal light by coupling the signal light with the local light in an optical hybrid. The method includes steps of: detecting positive and negative elements of each of the I- and Q-components output from the optical hybrid; compensating the positive and negative elements of each of the I- and Q-components so as to keep an equivalent magnitude of the I- and Q-components in constant; and evaluating the phase difference between the compensated I- and Q-components.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF PREFERRED EMBODIMENTS

Next, some preferred embodiments according to the present invention will be described as referring to drawings. In the description of the drawings, the numerals or symbols same or similar to each other will refer to the elements same or similar to each other without overlapping explanations.

Figure 1:
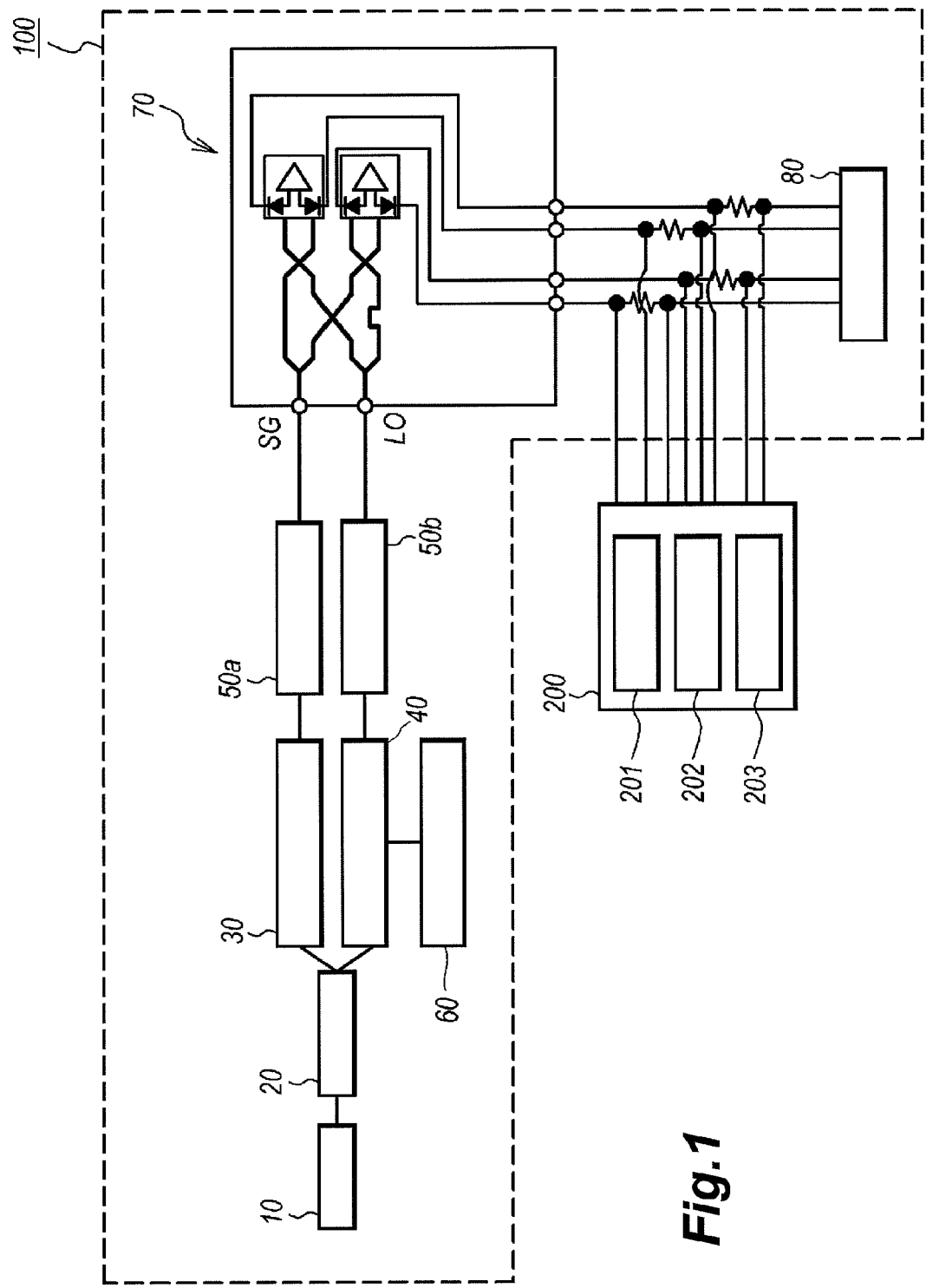
FIG. 1 is a functional block diagram of a device including a processor to evaluate the phase difference according to an embodiment of the present invention.
Figure 2:
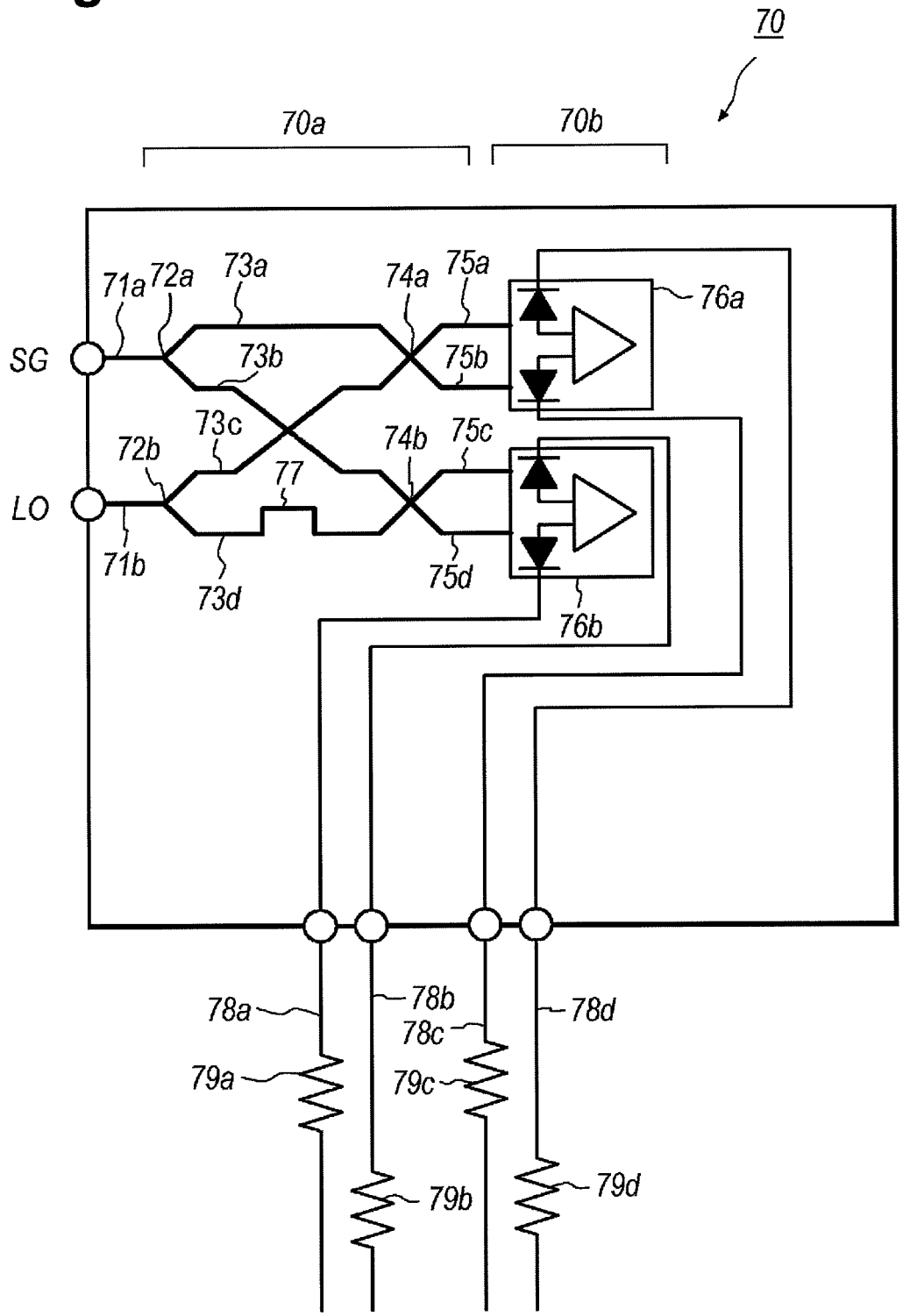
FIG. 2 is a detail of the optical hybrid implemented within the device shown in FIG. 1.

FIG. 1 is functional block diagrams of a processor 200 to measure the phase difference between the I- and Q-components the optical signal and a device 100 to manipulate the optical signal whose phase is measured by the processor 200. While, FIG. 2 shows a functional block diagram of a front end 70 implemented within the device 100. The processor 200 includes a detector 201, a compensator 202, and an evaluator 203. The detector 201, which may be an oscilloscope, detects positive and negative elements of the I- and Q-components of the signal output from the front end 70. The compensator 202 compensates these positive and negative elements of the components, while, the evaluator 203 determines the phase difference between the components using the compensated I- and Q-components output from the compensator 202.

As shown in FIG. 1, the device 100 includes an optical source 10, an optical splitter 20, an optical attenuator 30, a phase modulator 40, polarization controllers, 50a and 50b, a function generator 60, the front end 70, a bias power supply 80 for photodiodes, and so on. The optical source 10 is a type of a semiconductor laser diode (hereafter denoted as LD), but not restricted to those LDs. The optical splitter 20 divides light output from the optical source 10 into two or more beams, two beams in the embodiment shown in FIG. 1, by a preset ratio.

The optical attenuator 30 attenuates the optical power of one of optical beams divided by the optical splitter 20. The attenuated beam enters the one of the polarization controllers 50a, where the controller 50a manipulates the polarization status of the light entering therein. The light output from the polarization controller 50a enters the front end 70 as the signal light.

The phase modulator 40 modulates in low frequencies the other of the optical beams divided by the optical splitter 20. The modulation signal having low frequency components for the phase modulator 40 is provided from the function generator 60. The optical signal output from the phase modulator 40 enters the other of the polarization controllers 50b that controls the polarization status of the light entering therein. The optical beam output from the polarization controller 50b enters the front end 70 in a local input as the local light.

As shown in FIG. 2, the front end 70 includes the optical hybrid 70a and the detector unit 70b. The signal light input to the signal input SG of the hybrid 70a is divided into two beams by an optical coupler 72a after propagating in an input waveguide 71a; while, the local light input to the local input LO of the hybrid 70a is also divided into two beams by the other optical coupler 72b after propagating in the other input waveguide 71b. Two optical beams divided by the first optical coupler 72a propagate in respective arm waveguides, 73a and 73b, and enter optical couplers, 74a and 74b. Other two optical beams divided by the other optical coupler 72b propagate in respective arm waveguides, 73c and 73d, and enter the optical couplers, 74a and 74b.

The signal beams and the local beams entering the optical couplers, 74a and 74b, couple and interfere with each other thereat and output by two beams to cause a phase difference of 180° between thus divided two beams. Specifically, the optical beams output from the optical coupler 74a, which are interfered between the signal light and the local light, enter the differential receiver 76a after propagating in the output waveguides, 75a and 75b; while, the other optical beams output from the optical coupler 74b, which are also interfered between the signal light and the local light, enter the differential receiver 76b after propagating in the output waveguides, 75c and 75d. Each of PDs in the differential receivers, 76a ad 76b, is biased by the bias power supply 80.

One of arm waveguides, 73a to 73d, provides a phase shifter, where the fourth arm waveguide 73d has the phase shifter 77 in the present embodiment. The phase sifter 77 makes it possible that the differential receivers, 76a and 76b, independently recovers I-component and Q-component, each of which includes the positive and negative elements by detecting optical signals output from the couplers, 74a and 74b, via the output waveguides, 75a to 75d, differentially by respective differential detectors, 76a and 76b. The I-component means that the component is in-phase to the local light; while, Q-component means that the component has a phase different by 90° ($\pi/2$) from that of the local light.

Figure 3:
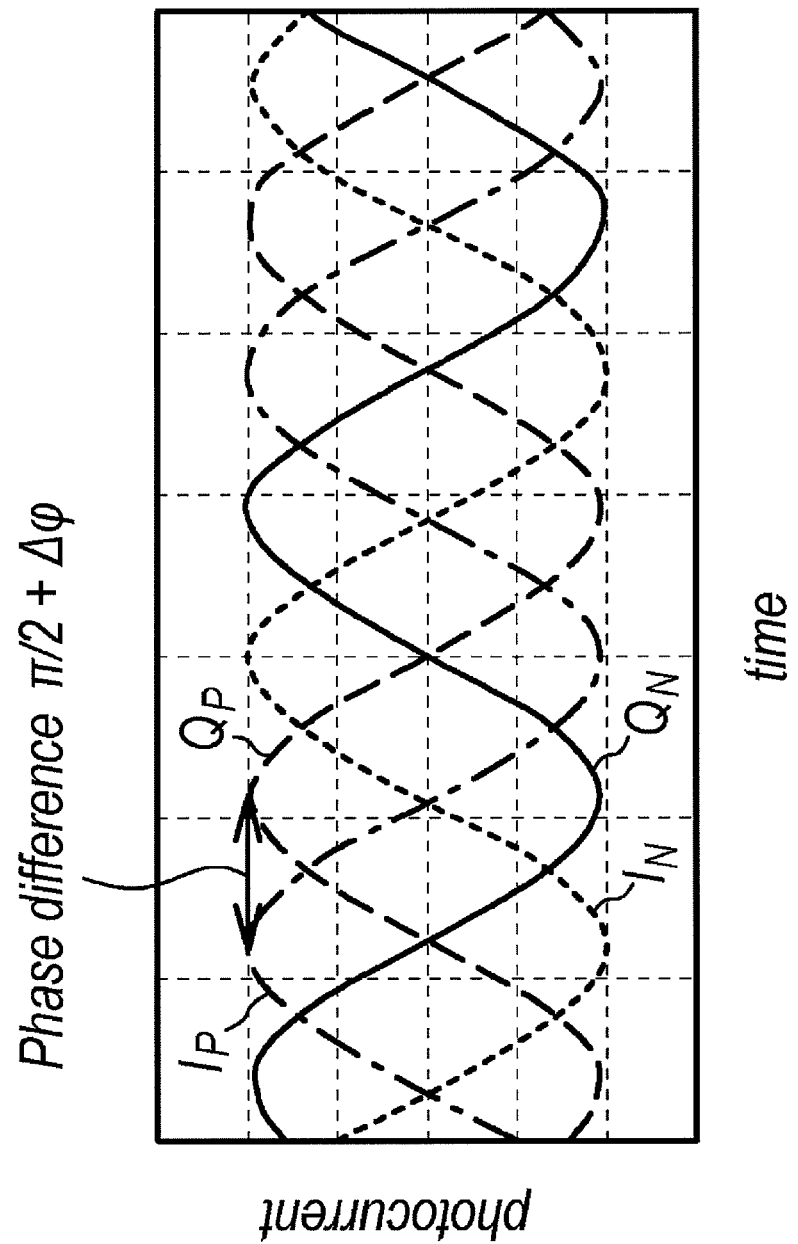
FIG. 3 shows waveforms of photocurrents of positive and negative elements of the I-component and the Q-component each detected by photodiodes in the detector unit.

The PDs implemented within each of the differential receivers, 76a and 76b, are electrically biased by the bias power supply 80 via resistors, 79a to 79d, to sense a photo-current generated by respective PDs. FIG. 3 illustrates waveforms sensed through the resistors, 79a to 79d, where FIG. 3 includes the I- and Q-components in positive and negative elements thereof, $I_P$, $I_N$, $Q_P$ and $Q_N$. Respective elements are typically illustrated by a sine wave, and the positive and negative elements thereof are complementary to each others. The phase difference between the I- and Q-components is exemplarily denoted by a difference between respective maxima of the positive elements, or those of the negative elements, which is ideally 90°. The positive element of I-component and that of Q-component are denoted by:

$$I_P = e \times \cos(\omega t), \quad (1)$$

and $$Q_P = f \times \cos(\omega t + \Delta\phi - \pi/2) = f \times \sin(\omega t + \Delta\phi), \quad (2)$$

Figure 4:
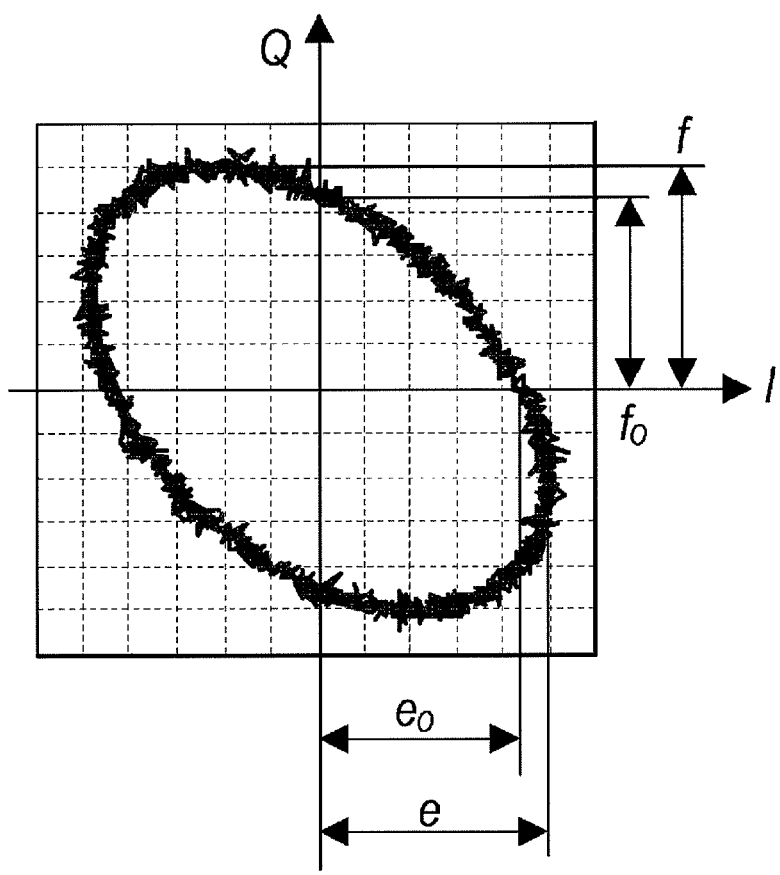
FIG. 4 shows an example of the Lissajous figure drawn from the photocurrents.

FIG. 4 shows a typical output, which includes the I- and Q-components, of the detector 201, where the present embodiment provides the oscilloscope as the detector 201. In FIG. 4, the I- and Q-components may create a Lissajous figure. When the phase difference between two components is ideally 90°, then the Lissajous figure shows a complete circle; while, the phase difference shifts from 90°, the Lissajous figure becomes an ellipsoid with a major axis inclined by −45° from the horizontal axis assuming that the magnitude of respective components, e and f, in the above equations 1 and 2 are equal to each other, and the phase difference $\Delta\phi$ between two components, I and Q, is given by a ratio of the magnitude $e_0$ when the Q-component becomes zero to the maximum e of the I-component. That is, the phase difference $\Delta\phi$ is given by:

$$\Delta\phi = \cos^{-1}(e_0/e). \quad (3)$$

Or, equation 3 is equivalently rewritten to an equation of:

$$\Delta\phi = \cos^{-1}(f_0/f), \quad (3')$$

where $f_0$ is a magnitude of the Q-component when the I-component becomes zero, and f is the maximum of the Q-component.

Figure 5:
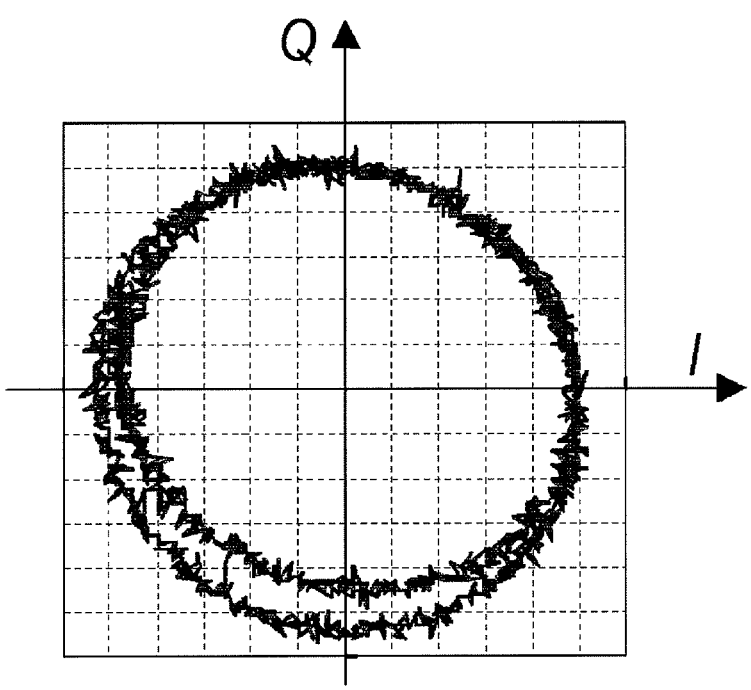
FIG. 5 shows an example of the Lissajous figure influenced by the fluctuation of the power of the optical signal input to the optical hybrid.

When the optical signal input to the hybrid 70a, or those output therefrom accompanies with noises or fluctuations in the power thereof, the Lissajous figure is deformed. FIG. 5 shows an example of the Lissajous figure distorted by the fluctuations in the optical power thereof. The distorted Lissajous figure enhances an error or a large tolerance in the resultant phase difference $\Delta\phi$. The optical receiver according to the present embodiment provides a function to avoid, or to reduce influences of the power fluctuation in the calculation of the phase difference between two components.

However, the phase of the signal output from the interference system of the hybrid 70a is theoretically free from the power fluctuation. Accordingly, the correction only for the power fluctuation reduces the error during the calculation of the phase difference.

The hybrid 70a outputs two components, I and Q, in the differential mode, that is, the hybrid 70a outputs the positive and negative elements of I-components, and those of Q-components. Moreover, the power fluctuation is reasonably assumed to be appeared in the positive and negative element evenly. Therefore, the outputs of the hybrid 70a are corrected so as to keep a sum of the positive and negative elements of respective components in constant. Thus, the power fluctuation may be compensated.

In an example, the compensator 202 divides respective inputs $I_{P,N}$ by an average of the both as indicated in equations 4 and 5, where $A_I$ and $A_Q$ are the average of I-component and Q-component, respectively, which is a sum of their positive and negative elements. According to the procedure thus described, the power fluctuation with a period substantially equal to or less than the period of the input optical signal may be compensated.

$$I'_{P,N} = I_{P,N}/A_I, \quad (4)$$

$$Q'_{P,N} = Q_{P,N}/A_Q. \quad (5)$$

Figure 6:
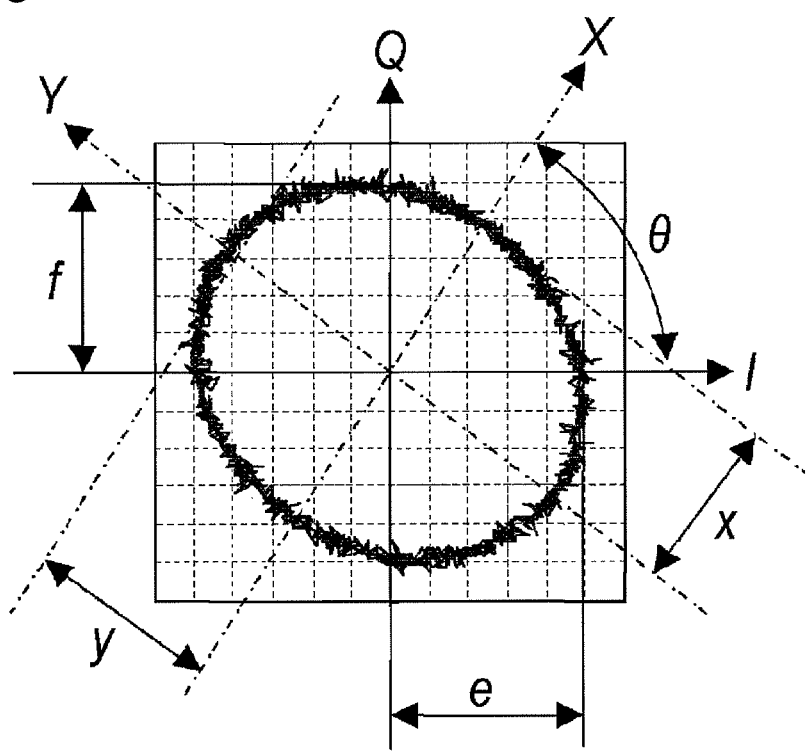
FIG. 6 shows an example of a Lissajous figure drawn by the compensated I-component and the compensated Q-component.

In equations 4 and 5, $I_{P,N}$ denotes one of the positive element and the negative element of I-component, while, $I'_{P,N}$ is their compensated component. Similarly, $Q_{P,N}$ denotes one of the positive and the negative element of Q-component, while, $Q'_{P,N}$ is their compensated component. The compensator 202 draws a Lissajous figure using the compensated components, $I'_{P,N}$ and $Q'_{P,N}$. FIG. 6 is an example of the Lissajous figure thus drawn using the compensated components.

When the least square fitting is applied to the determination of parameters, e, f, and φ, appeared in equations 1 to 3, the method inherently includes the phase fluctuation, which enhances an error of the parameters, e, f, and φ, accordingly the parameter $e_0$. In a modified embodiment of the application, the phase fluctuation is eliminated by procedures described below.

That is, the compensator 202 first applies the least square fitting to draw the Lissajous figure by eliminating noises. Then, when the drawn Lissajous figure has an ellipsoid, parameters attributed to the ellipsoid and satisfying equations 6 to 8 below are reduced. In equations 6 to 8, x and y are the magnitude along the minor and major axes, X and Y, respectively, of the ellipsoid, and θ is an angle between the X-axis and the I-axis.

$$X^2/x^2 + Y^2/y^2 = 1, \qquad (6)$$

$$X = I \times \cos(\theta) + Q \times \sin(\theta), \qquad (7)$$

$$Y = -I \times \sin(\theta) + Q \times \cos(\theta). \qquad (8)$$

Inserting equations 7 and 8 into equation 6, then an equation 9 below is obtained.

$$(I \times \cos(\theta) + Q \times \sin(\theta))^2/x^2 + (-I \times \sin(\theta) + Q \times \cos(\theta))^2/y^2 = 1. \qquad (9)$$

Substituting equations 1 and 2 into equation 9, the following equation 10 is finally obtained.

$$\sin(\Delta\phi) = (x^2 - y^2) \times \tan(\theta) / \{(x^2 \times \tan^2(\theta) + y^2) \times (x^2 + y^2 \times \tan^2(\theta))\}^{1/2}. \qquad (10)$$

Figure 7:
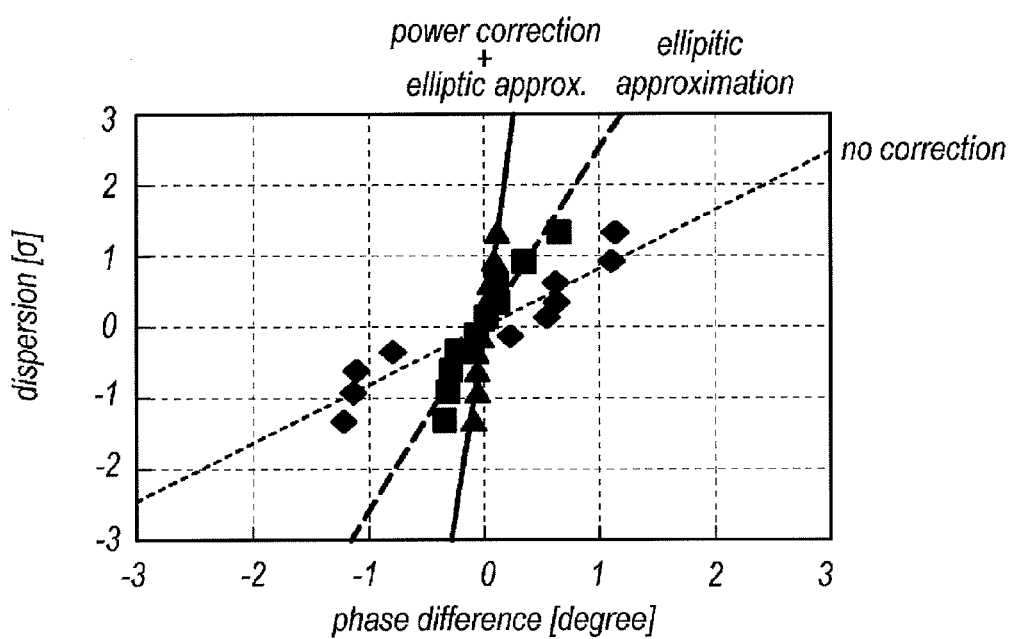
FIG. 7 compares the dispersion of the phase difference determined under respective corrections and approximations.

The correction for the power fluctuation in the optical input combined with the elliptic approximation may considerably reduce the scattering of the calculated phase difference. FIG. 7 shows the dispersion of the calculated phase difference. The dispersion of the phase difference expands to ±1.3° without any corrections of the power fluctuation and the elliptic approximation. Only the elliptic approximation improves the dispersion to around ±0.7°; and the combination of the correction of the power fluctuation and the elliptic approximation further improves the dispersion to about ±0.3°.

According to the embodiment thus described, the influence from the power fluctuation to the calculation of the phase difference is reduced, or eliminated by correcting respective optical outputs from the hybrid 70 to divide by the sum of the positive and negative elements, namely, an average of each components. Moreover, the elliptic approximation, that is, the Lissajous figure drawn by the I- and Q-components is evaluated by the rotated ellipsoid may avoid the phase fluctuation inherently accompanied with raw optical signals output from the hybrid 70a.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device to detect a phase difference between an I-component and a Q-component of an optical signal caused by an optical hybrid by coupling signal light with local light, the device comprising:
    a detector to detect a positive element and a negative element of each of the I-component and the Q-component;
    a compensator to generate a compensated I-component so as to keep an equivalent magnitude of the I-component in constant and generate a compensated Q-component so as to keep an equivalent magnitude of the Q-component in constant; and
    an evaluator to determine a phase difference between the compensated I-component and the compensated Q-component,
    wherein the compensator generates the compensated I-component by dividing the positive element and the negative element of the I-component by a sum of the positive element and the negative element of the I-component, and the compensated Q-component by dividing the positive element and the negative element of the Q-component by a sum of the positive element and the negative element of the Q-component.

2. The device of claim 1,
    wherein the evaluator detects the phase difference through a Lissajous figure elliptically drawn by the compensated I-component and the compensated Q-component.

3. The device of claim 2,
    wherein the compensator detects the phase difference by a relation of:

$$\cos(\Delta\phi) = e_0/e,$$

where $\Delta\phi$ is the phase difference between the I-component and the Q-component, $e_0$ is a magnitude of the I-component when the Q-component in an elliptic Lissajous figure becomes zero and e is a maximum of the I-component.

4. The device of claim 2,
    wherein the compensator detects the phase difference by a relation of:

$$\cos(\Delta\phi) = f_0/f,$$

where $\Delta\phi$ is the phase difference between the I-component and the Q-component, $f_0$ is a magnitude of the Q-component when the I-component in an elliptic Lissajous figure becomes zero, and f is a maximum of the Q-component.

5. The device of claim 2,
    wherein the compensator detects the phase difference between the I-component and the Q-component by a relation of:

$$\sin(\Delta\phi) = (x^2 - y^2) \times \tan(\theta) / \{(x^2 \times \tan^2(\theta) + y^2) \times (x^2 + y^2 \times \tan^2(\theta))\}^{1/2},$$

where $\Delta\phi$ is the phase difference between the I-component and the Q-component, x is a major axis of the elliptic Lissajous figure, y is a minor axis of the elliptic Lissajous figure, and θ is an angle between the major axis of the elliptic Lissajous figure and a direction corresponding to the I-component.

6. The device of claim 5,
    wherein the compensator carries out a least square fitting to the elliptic Lissajous figure.

7. A method to detect a phase difference between an I-component and a Q-component of signal light input by coupling the signal light with local light in an optical hybrid, comprising steps of:
    detecting a positive element and a negative element of the I-component, and a positive element and a negative element of the Q-component;
    compensating the positive element and the negative element of each of the I-component and the Q-component to generate a compensated I-component and a compensated Q-component so as to keep an equivalent magnitude of the I-component and the Q-component in constant; and evaluating the phase difference between the compensated I-component and the compensated Q-component, wherein the step of compensating includes a step of dividing the positive element and the negative element of the I-component by a sum of the positive element and the negative element of the I-component, and dividing the positive element and the negative element of the O-component by a sum of the positive element and the negative element of the Q-component.

8. The method of claim 7, wherein the step of compensating includes a step to compensate the positive element and the negative element of each of the I-component and the Q-component by referring to a magnitude of the signal light input to the optical hybrid.

9. The method of claim 7, wherein the step of evaluating includes steps of, drawing an elliptic Lissajous figure by the compensated I-component and the compensated Q-component, and determining the phase difference by a relation of $$\cos(\Delta\phi)=e_0/e,$$

where $\Delta\phi$ is the phase difference between the I-component and the Q-component, $e_0$ is a magnitude of the I-component when the Q-component in an elliptic Lissajous figure becomes zero, and e is a maximum of the I-component.

10. The method of claim 7, wherein the step of evaluating includes steps of, drawing an elliptic Lissajous figure by the compensated I-component and the compensated Q-component, and determining the phase difference by a relation of:

$$\cos(\Delta\phi)=f_0/f,$$

where $\Delta\phi$ is the phase difference between the I-component and the Q-component, $f_0$ is a magnitude of the Q-component when the I-component in an elliptic Lissajous figure becomes zero, and f is a maximum of the Q-component.

11. The method of claim 7, wherein the step of evaluating includes steps of, drawing an elliptic Lissajous figure by the compensated I-component and the compensated Q-component, and determining the phase difference by a relation of:

$$\sin(\Delta\phi)=(x^2-y^2)\times\tan(\theta)/\{(x^2\times\tan^2(\theta)+y^2)\times(x^2+y^2\times\tan^2(\theta))\}^{1/2},$$

where $\Delta\phi$ is the phase difference between the I-component and the Q-component, x is a major axis of the elliptic Lissajous figure, y is a minor axis of the elliptic Lissajous figure, and $\theta$ is an angle between the major axis of the elliptic Lissajous figure and a direction corresponding to the I-component.

12. The method of claim 11, wherein the compensator carries out a least square fitting to the elliptic Lissajous figure.

\* \* \* \* \*